US012791166B2

(12) United States Patent
McNett et al.

(10) Patent No.: US 12,791,166 B2
(45) **Date of Patent: *Nov. 10, 2026**

(54) GIFTING APPARATUS AND SYSTEM

(71) Applicant: Hallmark Cards, Incorporated, Kansas City, MO (US)

(72) Inventors: Johnathan David McNett, Kansas City, MO (US); Gary Thomas Pratt, Lawrence, KS (US); Kevin Weldon Swanson, Kansas City, MO (US); Orlanda Dominic Lacy, Kansas City, MO (US); Dennis Allan Evans, Oak Grove, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/301,505

(22) Filed: Aug. 15, 2025

(65) Prior Publication Data

US 2025/0369594 A1 Dec. 4, 2025

Related U.S. Application Data

(63) Continuation of application No. 18/799,766, filed on Aug. 9, 2024, now Pat. No. 12,398,861.

(Continued)

(51) Int. Cl.

| | |
|---|---|
| ***F21V 9/32*** | (2018.01) |
| ***F21V 23/04*** | (2006.01) |
| *F21W 121/00* | (2006.01) |
| *F21Y 113/00* | (2016.01) |
| *F21Y 115/10* | (2016.01) |

(52) U.S. Cl.

CPC ................ *F21V 9/32* (2018.02); *F21V 23/04* (2013.01); *F21W 2121/00* (2013.01); *F21Y 2113/30* (2023.05); *F21Y 2115/10* (2016.08)

(58) Field of Classification Search

CPC ... F21V 9/32; F21V 23/04; F21V 9/30; F21V 33/00; F21V 33/0004; F21Y 2115/10; F21Y 2113/30; F21W 2121/00; F21W 2121/004

See application file for complete search history.

(56) References Cited

U.S. PATENT DOCUMENTS 4,895,741 A * 1/1990 Coffman .................. D04D 7/10 D9/635
6,174,072 B1 * 1/2001 Root, Jr. ............. F21V 33/0028 362/253

(Continued)

*Primary Examiner* — Bao Q Truong
(74) *Attorney, Agent, or Firm* — Practus, LLP; Jesse J. Camacho

(57) ABSTRACT

A light-reactive gifting system includes, in one embodiment, an illumination device adapted to emit UV light, an ornamental attachment attached to or that forms at least a portion of the flat top of the illumination device, paper that includes a first light-reactive component that reacts to the UV light and is characterized by having a first visual appearance when not reflecting the UV light and a second visual appearance when reflecting the UV light, and an attachment mechanism that is useable to attach the illumination device to the paper thereby enabling the UV light to be cast in the direction of the paper and causing each of the first and second visual appearances based on activating or deactivating the UV LEDs.

20 Claims, 20 Drawing Sheets

Related U.S. Application Data

(60) Provisional application No. 63/635,562, filed on Apr. 17, 2024, provisional application No. 63/532,305, filed on Aug. 11, 2023.

(56) References Cited

U.S. PATENT DOCUMENTS

| | | | | |
|---|---|---|---|---|
| 6,568,828 | B2 * | 5/2003 | Rudoy | G09F 13/22<br>362/253 |
| 12,398,861 | B1 * | 8/2025 | McNett | F21V 9/32 |
| 2016/0207673 | A1 * | 7/2016 | Shlonsky | B65D 51/248 |

* cited by examiner

GIFTING APPARATUS AND SYSTEM

CROSS-REFERENCE TO RELATED APPLICATIONS

This application is a Continuation application of U.S. application Ser. No. 18/799,766 (filed on Aug. 9, 2024 and entitled GIFTING APPARATUS AND SYSTEM), which claims the benefit of U.S. Provisional Application No. 63/532,305 (filed on Aug. 11, 2023 and entitled LIGHT-REACTIVE GIFTING APPARATUS AND SYSTEM) and of U.S. Provisional Application No. 63/635,562 (filed Apr. 4, 2024 and entitled LIGHT-REACTIVE GIFTING APPARATUS AND SYSTEM). All the aforementioned applications are incorporated by reference herein in their entirety for all purposes. This application also incorporates by reference U.S. patent application Ser. No. 16/694,535, filed on Nov. 25, 2019 and entitled "FOLDABLE ARTICLE WITH SLICEFORM."

BACKGROUND

Gift giving is a popular activity, especially during certain times of the year or during holidays such as Christmas and Diwali. During the Christmas season for example, gifts often remain under a Christmas tree for many days leading up to when the gifts are opened. Traditionally, little powered technology is employed in connection with wrapped gifts. The gifts can sit stagnant and in the same state for several nights.

But the gift-giving experience can be improved by enhancing wrapped gifts. For example, in accordance with an embodiment of the invention, a decorative UV light source can be coupled to a light-reactive wrapping paper that includes components whose visual characteristics vary when subjected to UV light. The light source can be further enhanced by including circuitry to carry out a variety of functions, such as turning the lights on and off, varying their intensity, initiating a blinking pattern, responding to auditory input, and the like. In this way, enjoyment of receiving a gift is enhanced as the recipient experiences various patterns on wrapping paper that vary with the UV light. Likewise, gift giving is made more meaningful as the giver is able to provide a more impactful or intentional gifting experience to the recipient.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing or electronic process that may be performed using any combination of hardware, firmware, and/or software. For instance, various functions may be carried out by a processor executing instructions stored in memory. Some methods may also be embodied as computer-usable instructions stored on computer storage media.

Embodiments of the disclosed technology include illumination-ready or illumination-enhanced gift-presentation substrates that, in some embodiments, feature UV-reactive components incorporated into the printing ink or component material. Illumination can be triggered in response to UV light from an external source, such as a UV-LED powered base, a UV light-emitting tree ornament/tree skirt, an illuminated 3-D paper sculpture that disperses UV-LED light for reacting with the substrate treatment, tree under-mount UV-LED lighting, glowing light stands underneath a tree (or other item), for example. The UV-LED component may illuminate a variety of substrates that are treated with the UV-reactive ink component, whether or not directly coupled to the light element.

In the case of a bow embodiment, a single or multiple bows may be configured to react to a UV LED light source that is coupled to or positioned near the bow. A bow orientation can be optimized to intentionally reflect light in specific directions, react with UV-LED light, and illuminate a package (or other item) based on interaction with UV LED light emitted from, within, adjacent to, or near the bow (or other ornamental attachment)

Figure 1:
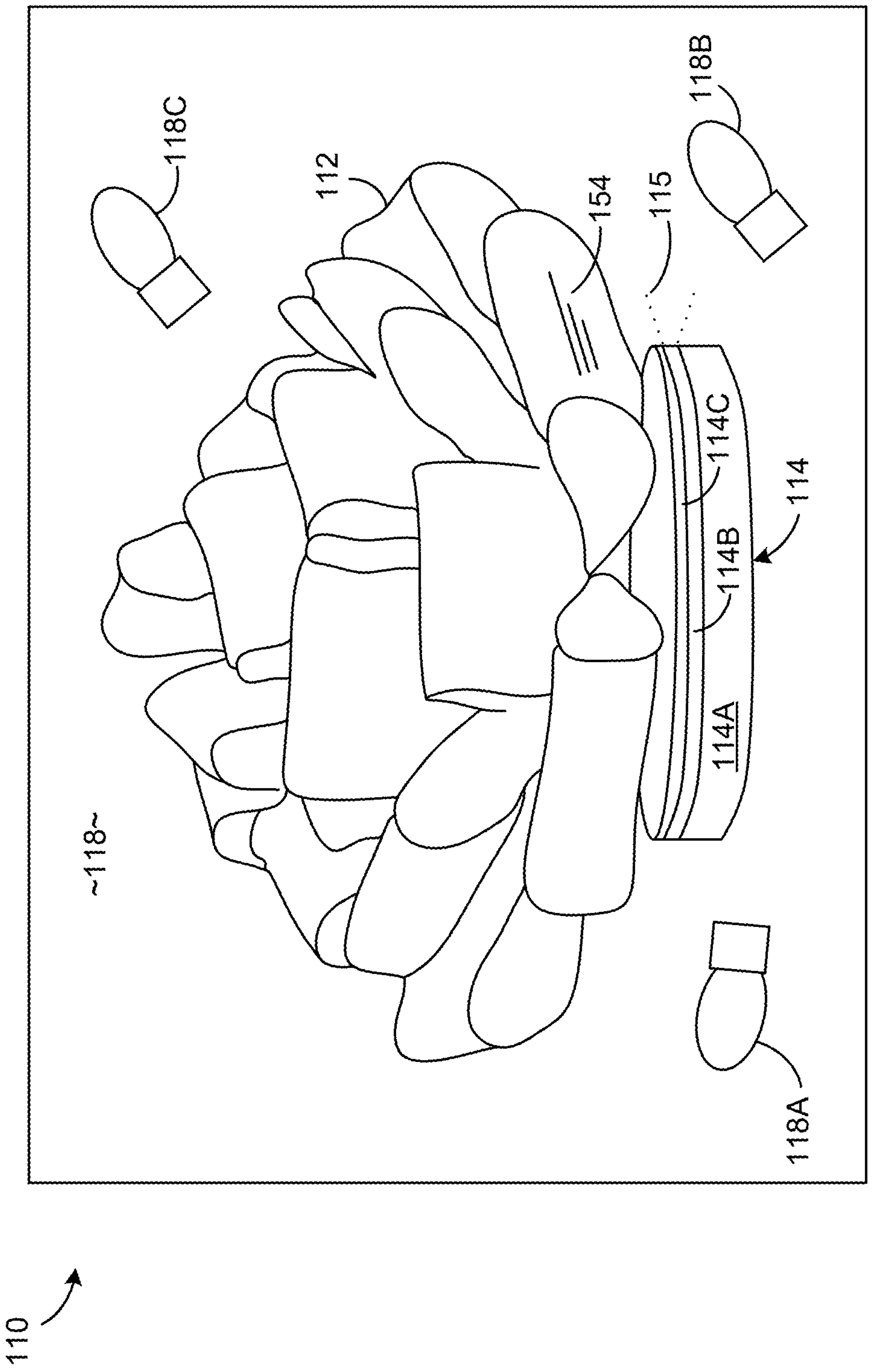
FIG. 1 depicts an arrangement of a light-reactive gifting system in accordance with an embodiment of the disclosed technology.
Figure 1A:
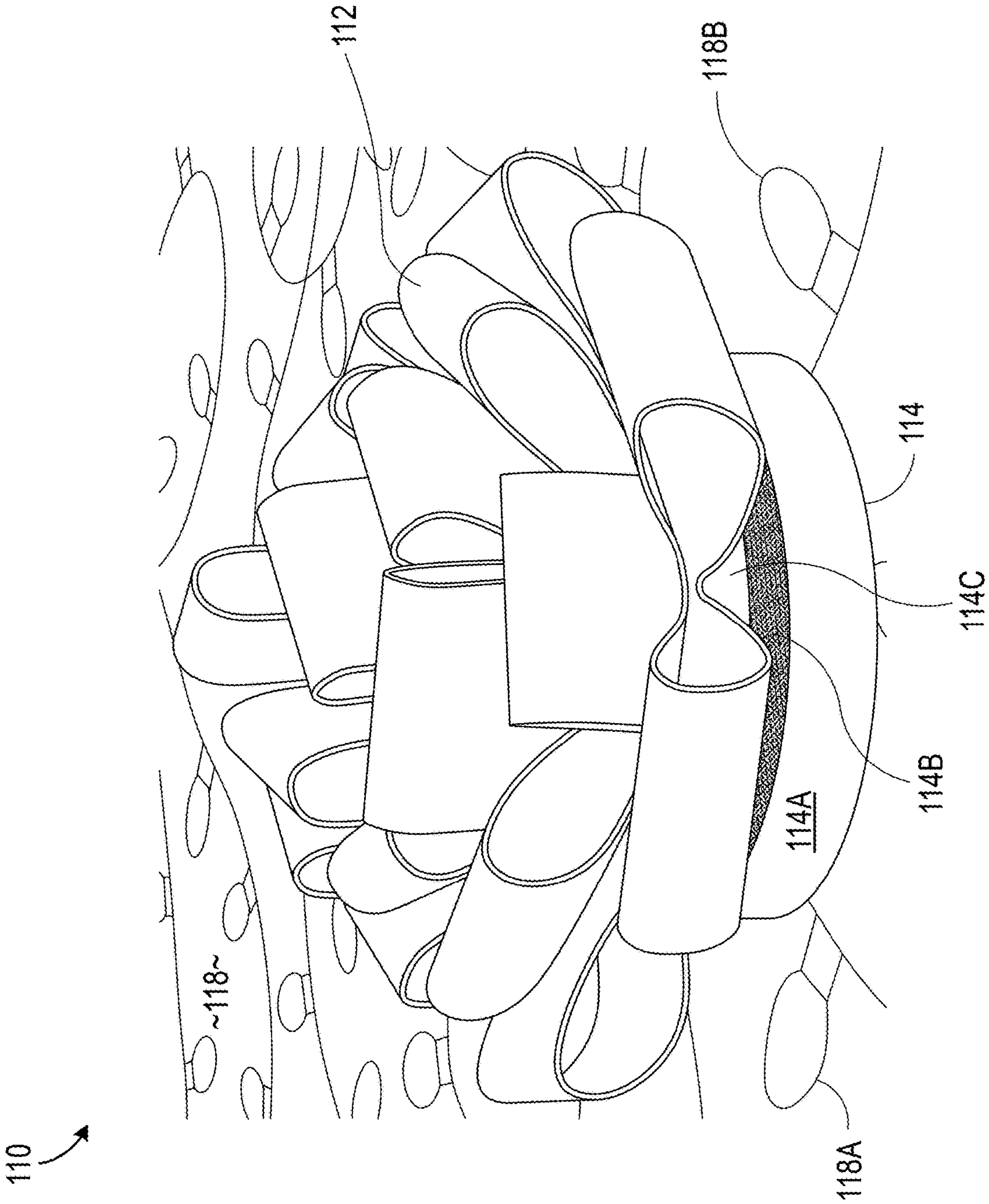
FIG. 1A depicts an arrangement of a light-reactive gifting system in accordance with an embodiment of the disclosed technology.

FIG. 1 depicts aspects of an illustrative light-enhanced gifting system 110 in accordance with an embodiment of the disclosed technology. FIG. 1A is substantially similar to FIG. 1, including the same reference numerals. References to numerals in FIG. 1 are equally applicable to those in FIG. 1A.

System 110 includes an illumination device 114, which can take a variety of forms. In one embodiment, illumination device 114 includes a body that is adapted to be affixed to a planar surface. Illumination device 114 can, but does not have to, include a lower portion 114A that elevates a light-emitting portion 114B, which can be positioned below an optional upper portion 114C. Some embodiments may included only a single portion, others all three portions, and others fewer than all portions.

If included, lower portion 114A elevates light-emitting portion 114B so that UV light is cast over a greater surface area of paper 118. Similarly, if included, upper portion 114C elevates an ornamental attachment 112, which can take on a variety of forms. For example, it could be a bow, slice-form object, a pop-up mechanic, a topping, or other forms. It need not be an "attachment" in the sense that it must attach to anything. Rather, ornamental attachment 112 can be free-standing. In one embodiment, ornamental attachment 112 includes a printed reactive substrate or is infused with light-reactive ink or otherwise includes optical brighteners. Optical brighteners can take the form of additives that are added to ornamental attachment 112 to enhance its light-reactive (including light-reflective) properties.

Optical brighteners can include optical brightening agents (OBAs) that convert ultraviolet light and/or re-emit it in the visible spectrum, such as the visible blue spectrum. Including optical brighteners, light-reactive ink (or similar) in ornamental attachment 112 can enable it to fluoresce (or have the appearance of fluorescing) in a way that enhances the light-reflectivity or reactivity properties of ornamental attachment 112 such that reflects more light or appears to when exposed to light.

In some embodiments, optical brighteners are included only on certain surfaces of ornamental attachment 112, such as surfaces facing a light-emitting device. Similarly, in some embodiments, light-reactive agents are only included on certain surfaces of ornamental attachment 112. In this way, multi-surface reflections are targeted and intentional.

Ornamental attachment 112 can be made of paper, plastic, other materials, or combinations thereof. In some embodiments, ornamental attachment 112 includes integrated LEDs (light emitting diodes). The LEDs can assume a form factor and physical characteristics that allow them to be integrated into ornamental attachment 112 in a visually non-obstructive or obtrusive manner. In some embodiments, fiberoptics are not included.

Elevating ornamental attachment 112 can be advantageous because it can also optionally include a reflective surface 154 or can be composed of reflective material such as foil. Reflective surface 154 can reflect light (represented by numeral 115) back to the surface covered by paper 118. Note, our use of the term "ornamental" to describe an illustrative attachment 112 is not meant to intimate that it lacks functional aspects (e.g., in the design-patent sense). It may have functional attributes, such as fiber-optic attributes, light-reflective attributes, or other.

Paper 118 can take on a variety of forms, such as wrapping paper. Wrapping paper 118 can include one or more light-reactive print components, illustratively indicated by reference numerals 118A and 118B. In the embodiment shown, item 118A is a printed light. In the illustrative embodiment shown, the bulb portion is light reactive such that it has a first appearance when not reflecting UV light 115 and a second appearance when reflecting UV light. For example, when illumination device 114 is not activated, light-reactive print components 118A, 118B, etc., would be as imperceptible as other non-light-reactive portions of paper 118. But when illumination device 114 is activated, casting UV light 115 on to the surface of paper 118, resulting in bulbs 118A and 118B appearing to be glowing.

In some embodiments, paper 118 has a weight less than or equal to 150 grams per square meter (GSM). In other embodiments, it is less than or equal to 120 GSM, 100 GSM, 80 GSM, or 50 GSM. In other embodiments, the gifting system contemplates the use of a gifting bag (such as depicted in FIG. 4), and the aforementioned weights may not apply.

Figure 2:
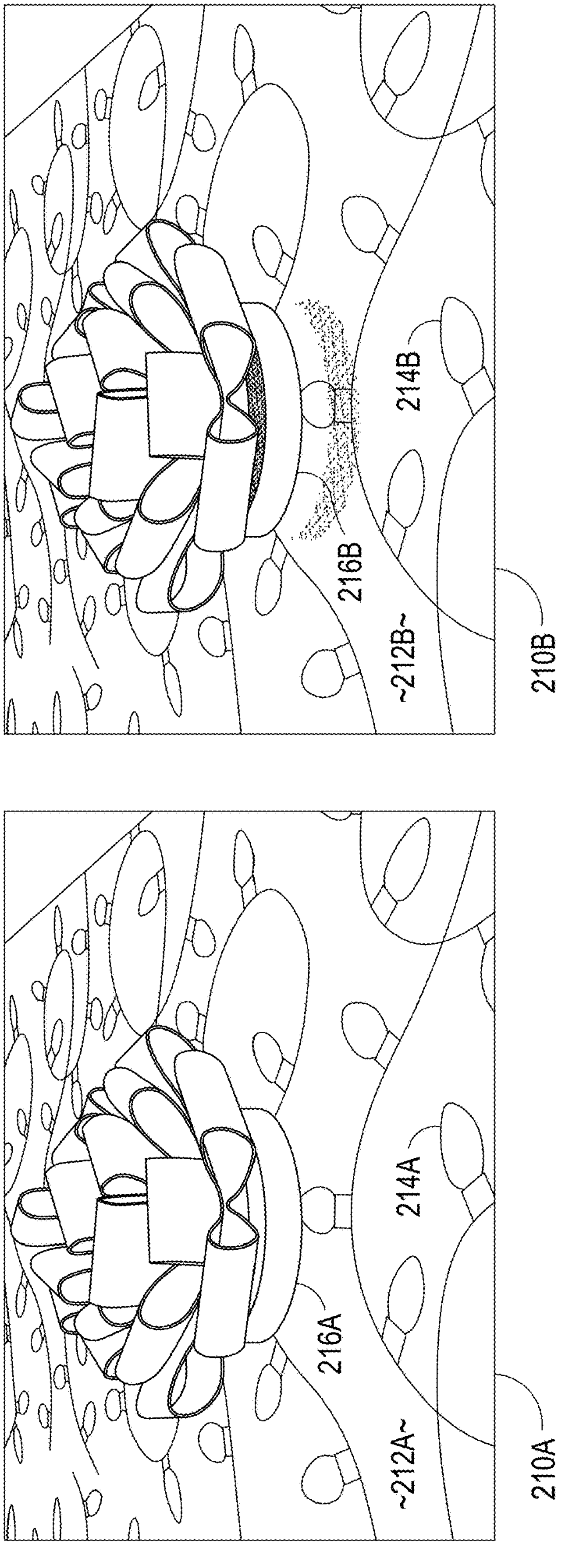
FIG. 2 depicts contrasting examples of an arrangement of a light-reactive gifting system in accordance with an embodiment of the disclosed technology where visual aspects of the system are shown as visually distinctive in the presence of UV light versus not.

FIG. 2 illustrates a comparison between two states: 210A (when the illumination device 216A is not activated) and 210B (when the illumination device 216B is activated). In state 210A, illumination device 216A is not casting UV light onto paper 212A, and as such, light-reactive print components (such as 214A) have a first visual appearance, namely, lacking the appearance of glowing. But in the second state of 210B, illumination device 216B is activated. Thus, it is casting UV light over the surface of paper 212B, causing the light-reactive print components of the paper to react to the UV light, and in this case, present the appearance of glowing. The light-reaching print components could be printed with UV-light-reactive ink; in other embodiments, UV-light-reactive paint or other could be used.

Figure 3:
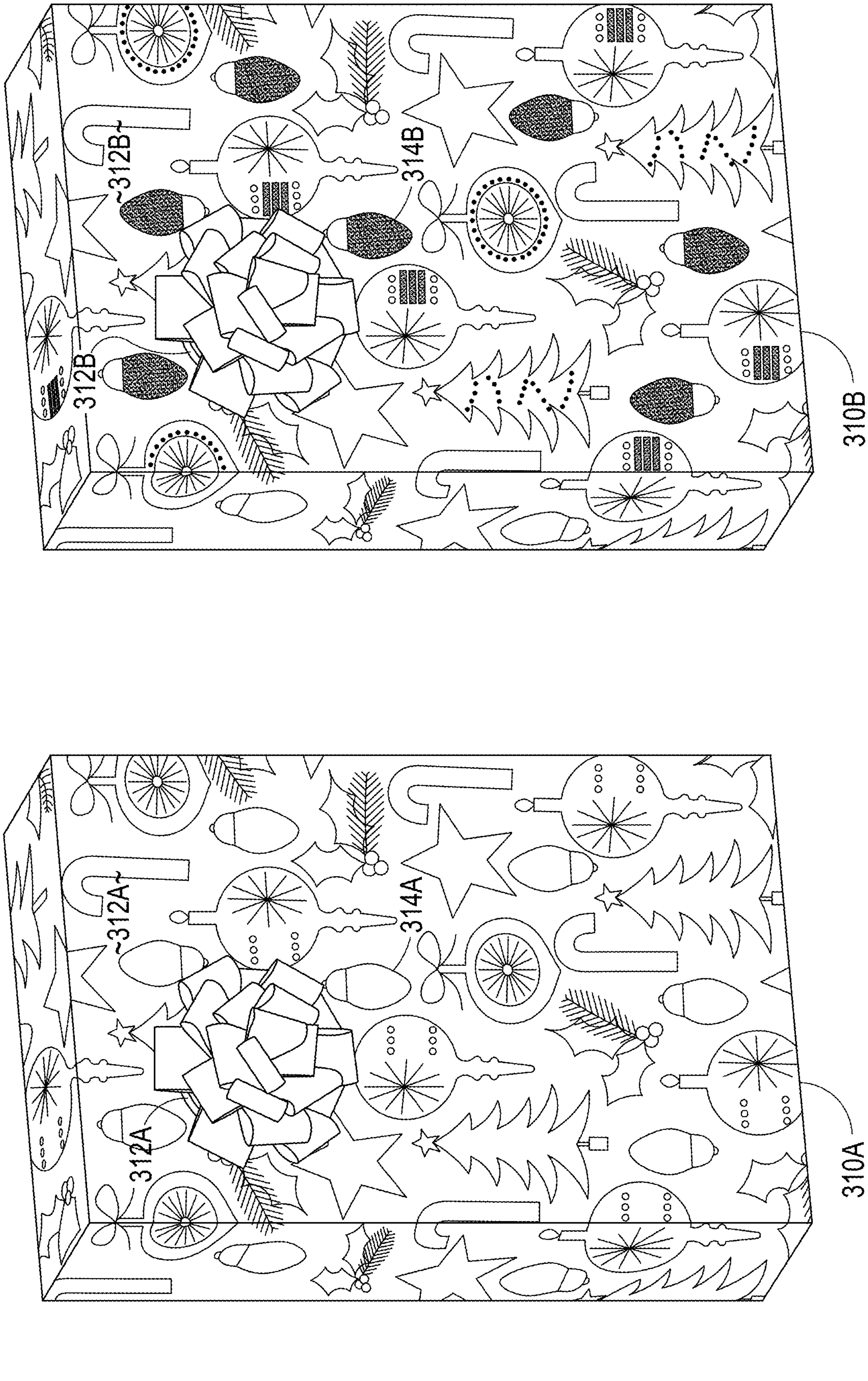
FIG. 3 depicts contrasting examples of an arrangement of a light-reactive gifting system in accordance with an embodiment of the disclosed technology where visual aspects of the system are shown as visually distinctive in the presence of UV light versus not.

FIG. 3 provides another example of contrasting visual appearances between a first state 310A (when illumination device 312A is off) versus a second state 310B (when illumination device 312B is on). As shown in state 310A, light-reactive print components (such as 314A) have a first visual appearance. But in state 310A, they 314B have a different appearance. For example, in the first state 310A, bulb 314A appears to have a first color. But in the second state 310B, it 314B appears to have a second color by virtue of reflecting UV light emitted from illumination device 312B.

Figure 4:
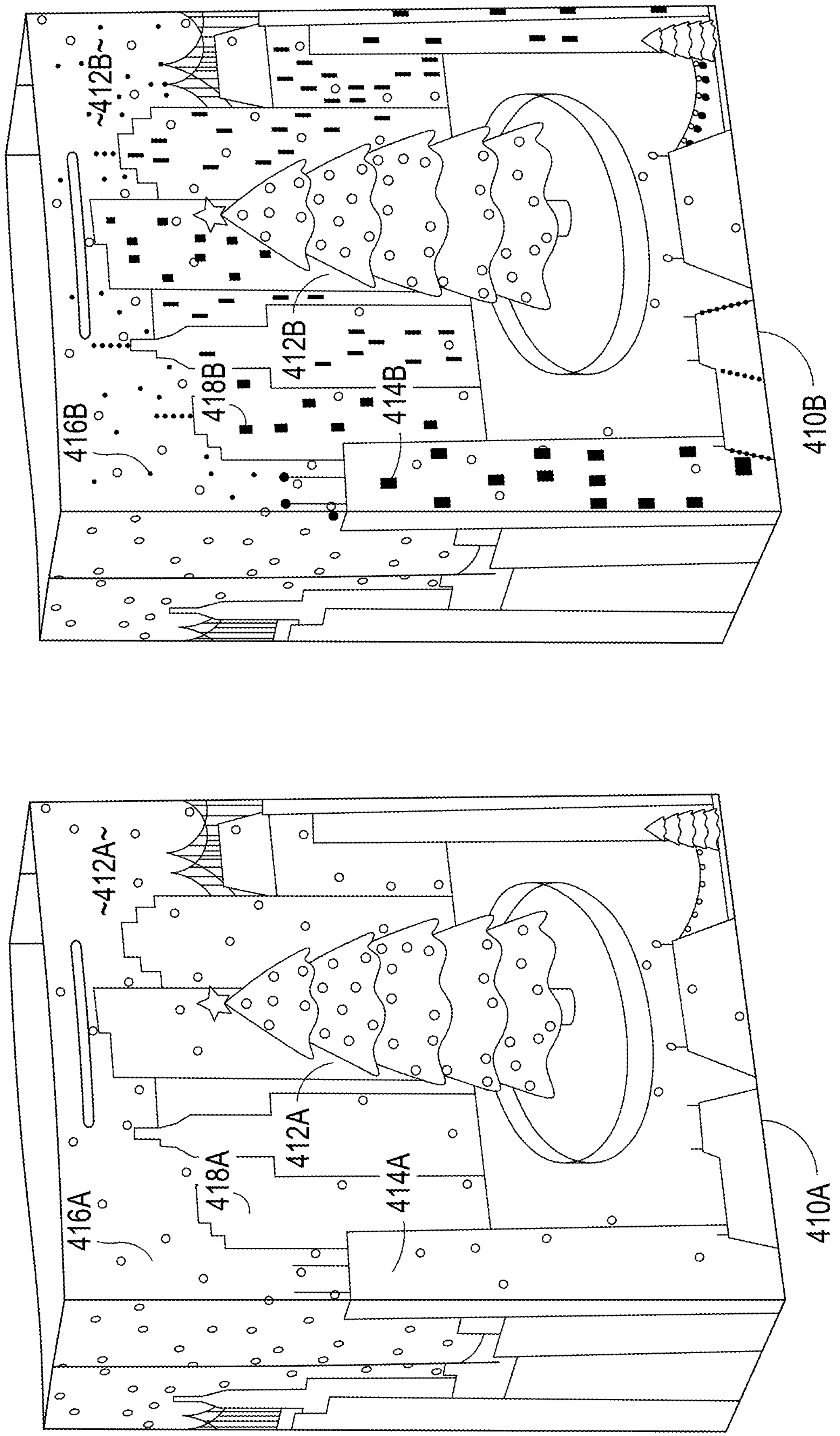
FIG. 4 depicts contrasting examples of an arrangement of a light-reactive gifting system in accordance with an embodiment of the disclosed technology where visual aspects of the system are shown as visually distinctive in the presence of UV light versus not.

FIG. 4 provides another example of contrasting visual appearances between a first state 410A (when illumination device 412A is off, or low intensity) versus a second state 410B (when illumination device 412B is on, or high intensity). As shown in state 410A, light-reactive print components (such as 414A) have a first visual appearance. But in state 410B, they 414B have a different appearance. For example, in the first state 410A, windows 414A, stars 416A, and windows 418A appear to have a first visual appearance (e.g., a first color, invisible, a different shade, etc.). But in the second state 310B, the starts 416 are now visible, windows 414B appears to be lit, or other windows 418B have a different color as a result of reflecting UV light from illumination device 412B.

Figure 5A:
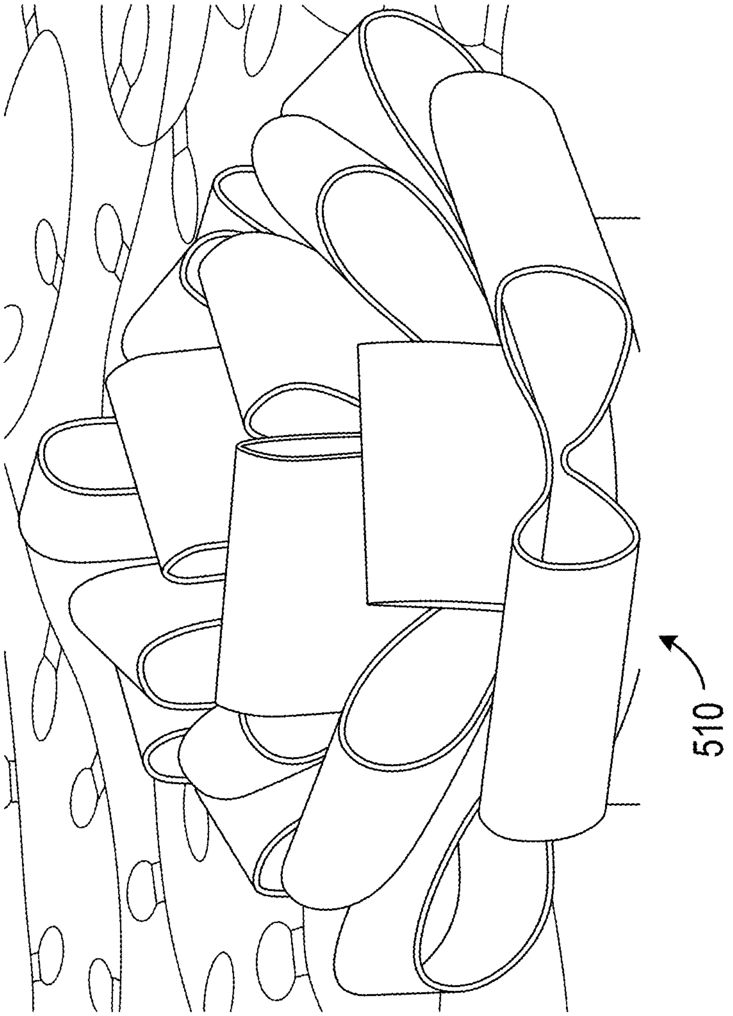
FIGS. 5A and 5B depict an illustrative bow component of a light-reactive gifting system in accordance with an embodiment of the disclosed technology.
Figure 5B:
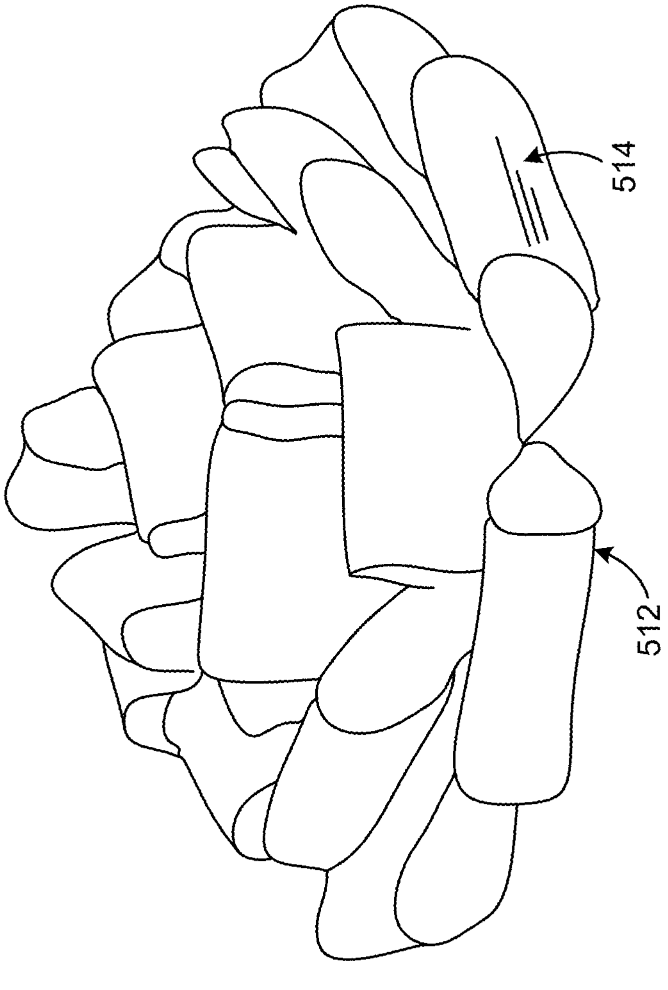

FIG. 5A depicts another illustrative ornamental attachment 510. It could take various forms, such as that of a flower, a cup, a pomp, or any other item attachable to a top surface of the illumination device. FIG. 5B is a line drawing similar to that of FIG. 5A. Bow 512 includes at least some surfaces 514 that are reflective. Alternatively, the entire bow or other object could be made of foil or another reflective surface.

In some embodiments, the ornamental attachment (e.g., 512) includes fiber-optics or fiber-optic material that accesses light from the LEDs and is emitted at the tips or via portions of the ornamental attachment. In other embodiments die-cuts allow light from attachment 512 to facilitate illumination of the attachment, design features of the attachment, or the area below it, in operation.

In some embodiments, ornamental attachment 512 is removable and reusable such that it can be used more than once and in multiple contexts.

Figure 6:
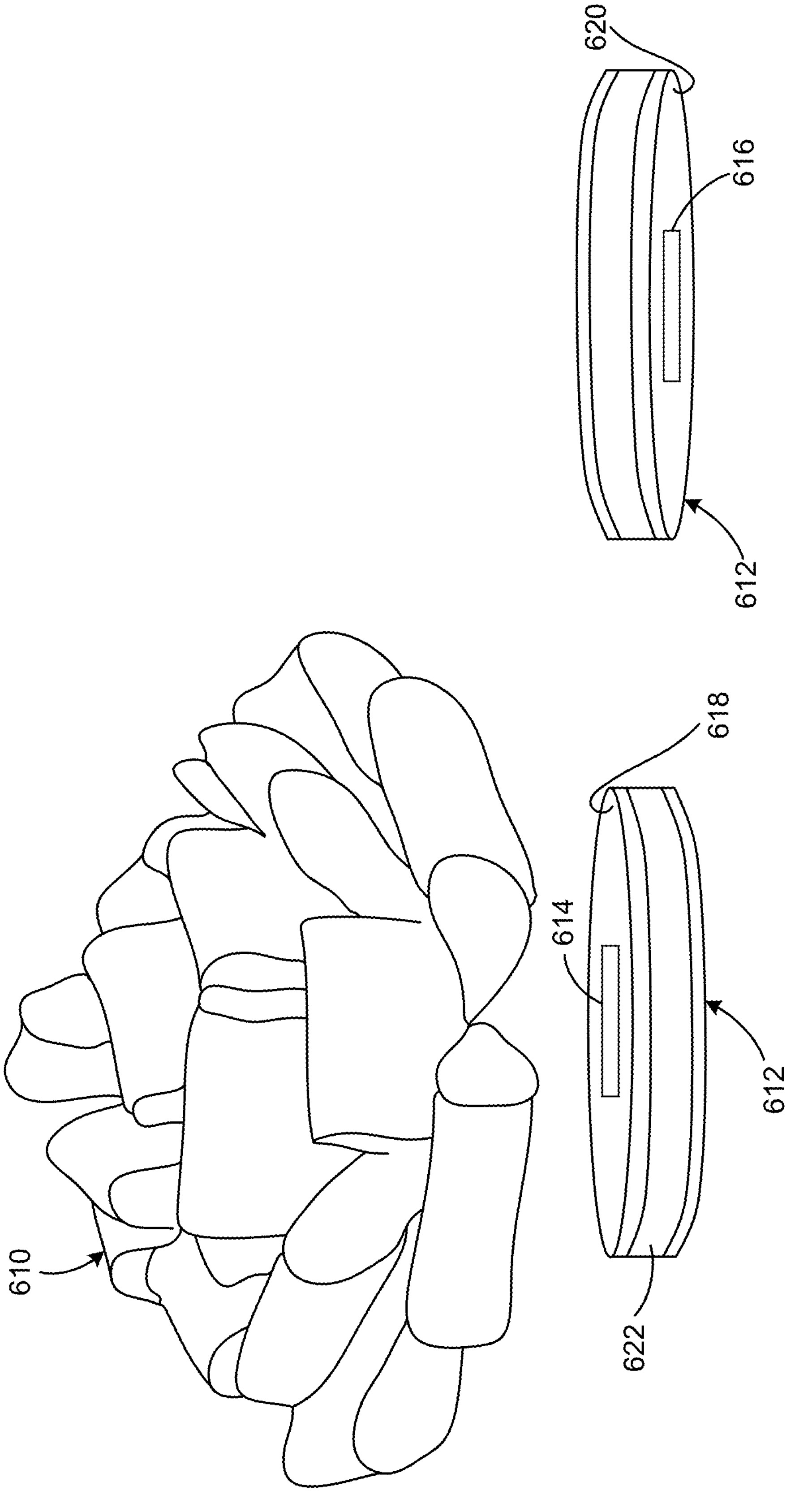
FIG. 6 depicts illustrative top and bottom surfaces of illustrative illumination devices of a light-reactive gifting system in accordance with an embodiment of the disclosed technology.

FIG. 6 illustrative that the upper attachment option 614 can take on a variety of forms, It 614 is useable to attach ornamental attachment 610 to an upper surface of illumination device 612. Attachment mechanism 614 can be an adhesive, a hook-and-loop arrangement, adhesive strips, and the like. In some embodiments, the attachment mechanism forms a part of ornamental attachment 610 instead of illumination device 612. In still other embodiments, the two 610 and 612 are integrated. Ornamental attachment 610 can be removable, wherein attachment mechanism 614 facilitates removal and replacement with other ornamental attachments 610.

Similarly, bottom attachment mechanism 616 is useable to attach illumination device 612 to a planar surface. It can be similar to upper attachment mechanism 614, as previously described.

FIG. 6 helps illustrate relevant aspects of embodiments of the disclosed technology. For example, in one embodiment, bottom surface 620 is substantially flat. By being flat, it is adapted to be easily affixed to a planar surface, such as a gift box, or at least a flat portion of a gift container. Similarly, upper surface 618, opposite lower surface 620, is also flat in one embodiment. That helps disperse light from illumination device 612 and helps accommodate being attached to ornamental attachment 610.

The arrangement and physical characteristics of the top 618 and bottom surfaces 620 along with the translucent perimeter section 622 is different from, say, a flashlight. Typical flashlights emit light from our direction. Light is intended to be emitted in one direction, namely away from the rear of the flashlight. But in the embodiments shown, a light-dispersing section 622 is sandwiched between two opaque surfaces so as to cast UV light around a perimeter of the illumination device 612. An upper opaque surface 618 prevents light from escaping upwards away from a wrapping-paper surface. And a lower opaque surface (which can also include heat-resistant material) prevents light from escaping out of a the bottom of illumination device 612. These aspects are seen more clearly in FIG. 7.

Figure 7:
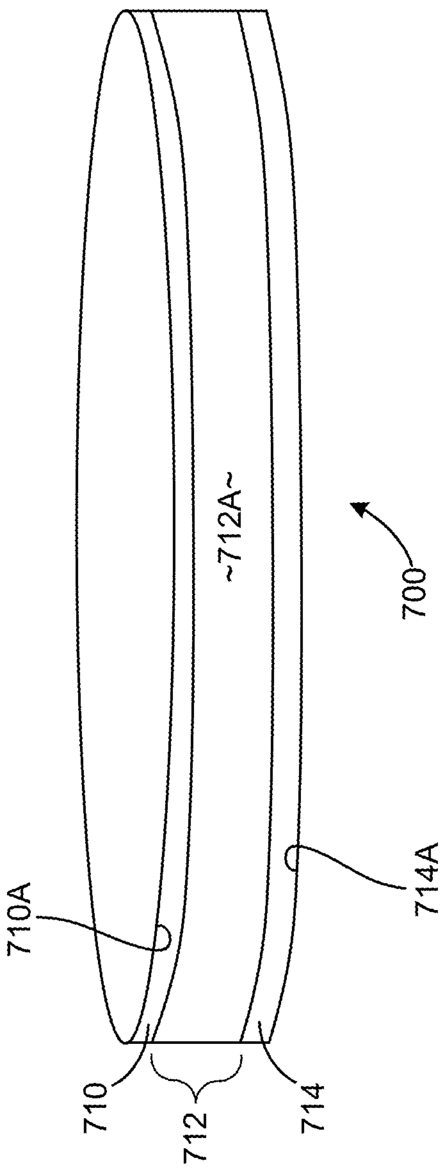
FIG. 7 depicts an illustrative illumination device of a light-reactive gifting system in accordance with an embodiment of the disclosed technology.

FIG. 7 depicts an illustrative illustration device 700 in accordance with an embodiment of the disclosed system. Device 700 might include three sections: a lower section 714, a light-emitting section 712, and an upper section 710. In some embodiments, upper and lower sections have essentially no meaningful thickness. In other embodiments, only lower section 714 and light section 712 are included. In other embodiments, only light section 712 and upper section 710 are included. And in still other embodiments, only light-emitting section 712 is included.

In some embodiments, illumination device 700 includes a body and each section is defined by layers of opaqueness as opposed to actual layers made of materials, such as plastic. For example, in one embodiment, body 700 includes only one internal void and lower section 714 is defined by a first opaque portion and upper section 710 is defined by a second opaque portion. The opaque portions could be composed of opaque material, opaque tape that obscures portions of light-emitting surface 712 or part of separate surfaces.

In other embodiments, light-emitting portion 712 consumes essentially the entirety of the height of the illumination device. Light-emitting portion 712 includes a translucent facial surface 712A in some embodiments. The degree of translucency can vary from allowing very little UV (or other) light to pass through to being clear. Facial surface 712A can be frosted, faceted, or embodied with other patterns so as to create desired visual effects when light passes through it. For example, in an embodiment that uses traditional LEDs in addition to UV LEDs, facets could be used to cast a varied light patter through the facial surface.

Figure 8:
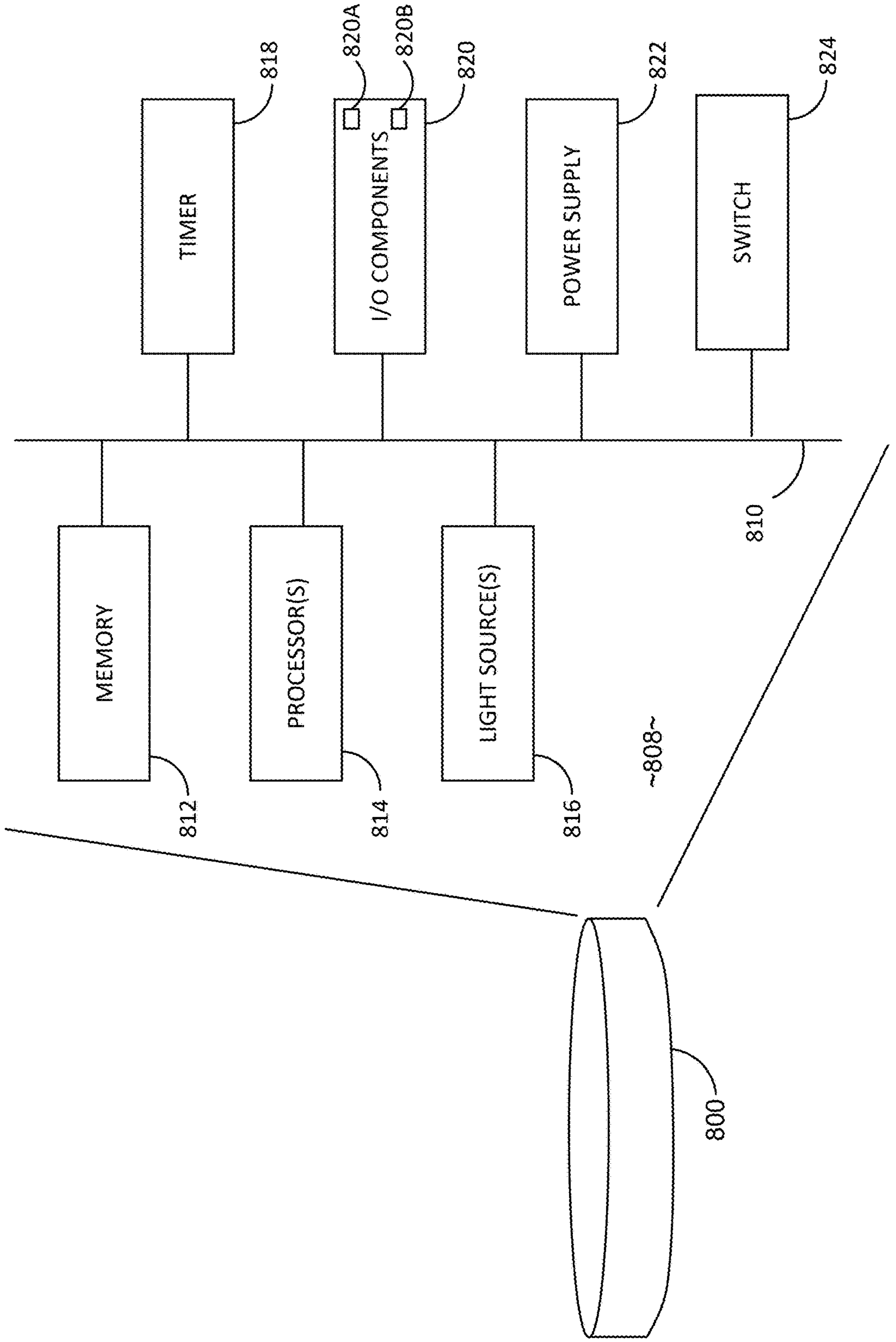
FIG. 8 depicts illustrative internal components of an illumination device of a light-reactive gifting system in accordance with an embodiment of the disclosed technology.

FIG. 8 illustrates illustrative electrical circuits and components (generally internal to illumination device 800) in the form of a computing device 808 that can provide various functional aspects. Computing device 808 can includes a variety of computer-readable media. Computer-readable media can include both volatile and nonvolatile media or memory 812, which can implement various methods or technologies for storage of information, such as computer-readable instructions, data structures, program modules or other data. Computer storage media includes, but is not limited to, RAM, ROM, EEPROM, flash memory, solid-state memory, or other memory technology that can be used to store desired information.

Computing device 808 includes one or more processors 814 that read data from various entities such as memory 812 or I/O components 820. Presentation component(s), including light sources 116, present light, which can be done in real time or in accordance with a program. Other presentation components include a speaker, vibrating component, user interface, or the like.

A timer 818 allows the light sources (e.g., traditional LEDs combined with UV LEDs) to be turned on or pulse at certain times of the day or even during certain days of the year. Timer 818 can also be sued to cause the LEDs to blink with varying durations. Time 818 is useable to automatically determine when the LEDs illuminate. In this way, timer 818 can be used to provide an aesthetically pleasing illuminated gift presentation (for example, under a Christmas tree or other holiday item) that would otherwise be a stale, dark arrangement.

I/O components 820 allow computing device 808 send and receive input. Illustrative components include a microphone, speaker, wireless communication devices, etc. Additionally, the computing device 808 may be equipped with (or operate in conjunction with) accelerometers or gyroscopes that enable detection of motion. The output of the accelerometers or gyroscopes may be provided to the light sources of the computing device 100. An intensity control can vary the intensity by which the LEDs emit light.

Another of an I/O component 820 includes a syncing controller 820A that allows multiple devices to work in conjunction with each other, such as to serially light, synchronously turn on or off, synchronously adjust a light-intensity level, respond to common sounds and the like. An audio controller 820B enables the device to respond to sounds. For example, the LEDs can blink or otherwise respond to audio inputs such that they, for example, increase in bright intensity with increased sound levels, vice versa, turn on in response to a sound, vice verse, etc.

Power supply 822 can be a battery or other power supply, such as an A/C port. The batter is preferably a button-cell type, such as an LR44 or other.

Switch 824 allows the light sources 816 to be powered on or off.

Figure 9:
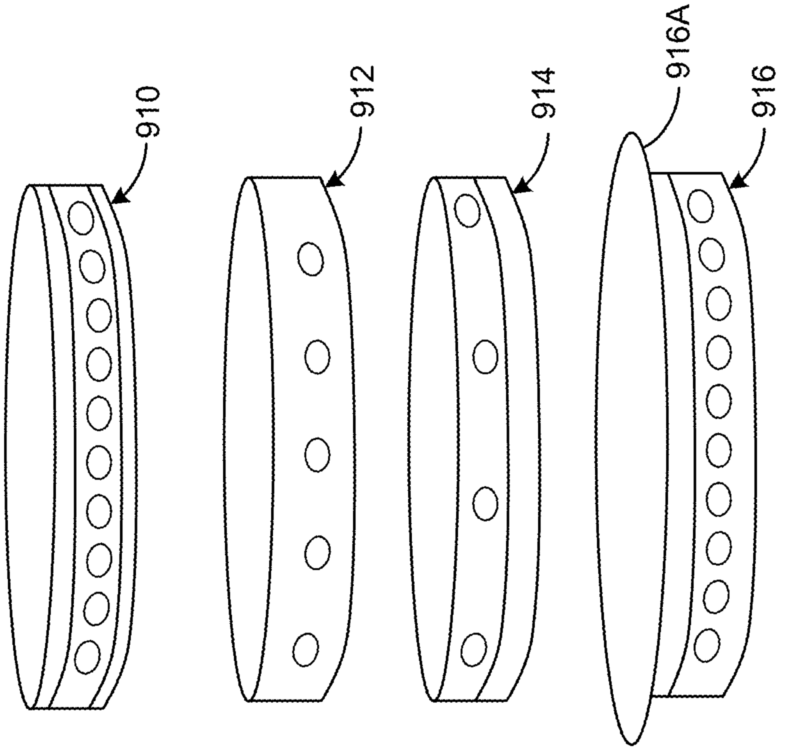
FIG. 9 depicts illustrative physical variations of an illumination device of a light-reactive gifting system in accordance with an embodiment of the disclosed technology.

FIG. 9 illustrates various embodiments of an illumination device. For example, it could include multiple sections as depicted by numeral 910. Alternatively, it could include a single section as indicated by numeral 912, which also indicates that a variable number of LEDs can be used. Embodiment 914 shows two sections (instead of three or one), and again, illustrates that a still different number of LEDs could be used (any number depending on a desired application).

Option 916 depicts an embodiment with an upper service 916A larger than a base portion. This embodiment advantageously helps direct light away toward the lower surface or prevent it from being directed upward. This is helpful to, for example, keep light from shining in users' eyes when, for example, the illumination device is on a present that sits on the floor for extended periods of time. Having an upper surface 916A that is a larger diameter than an opposite base is a departure from a light source such as a flashlight or other given that such an extended rim would limit light casting away from a base of a device instead of fostering it.

Figure 10:
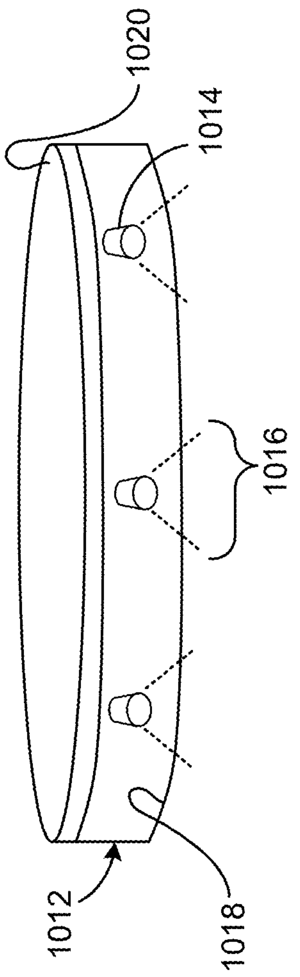
FIG. 10 depicts an illustrative embodiment of an illumination device with directional lighting of a light-reactive gifting system in accordance with an embodiment of the disclosed technology.

FIG. 10 illustrates that the LEDs can be directionally oriented to cast light in desired directions in some embodiments. For example, LED 1014 is oriented downwards, away from upper surface 1020 so as to cast light 1016 toward the surface that ornamental device 1012 is attached to. Similarly, the other LEDs in FIG. 10 are shown with directional orientations.

Figure 11:
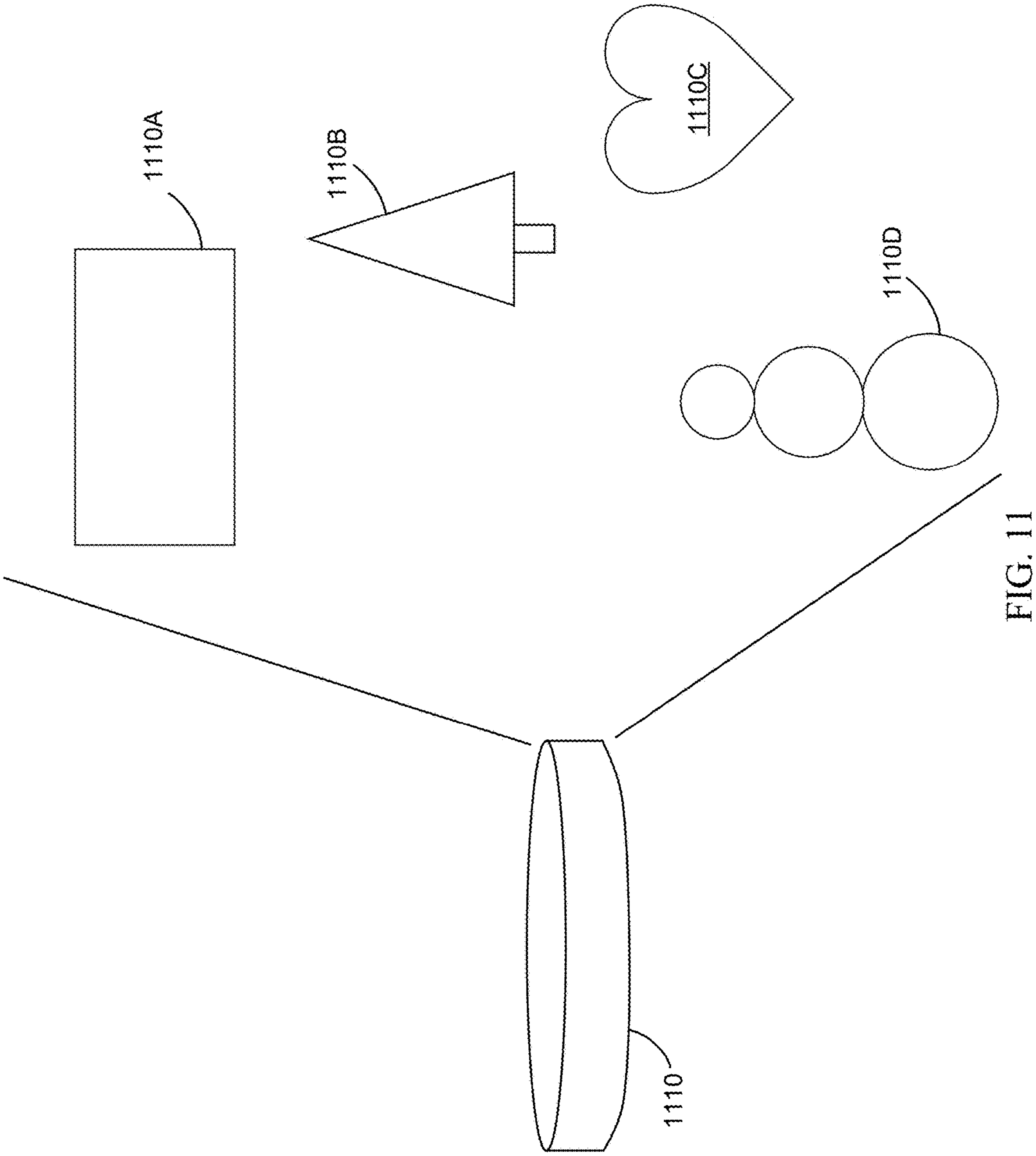
FIG. 11 depicts illustrative physical characterizations of an illumination device of a light-reactive gifting system in accordance with an embodiment of the disclosed technology.

As illustrated in FIG. 11, illumination device 1110 is not limited to the physical profile of a disc-shaped device. It could take on a variety of forms, shapes, and sizes, though each generally with a flat bottom surface and an opposite flat top surface (although the top surface itself might have two surfaces, its own top and bottom, and at least the bottom of the top surface would be generally flat, whereas the top of the top surface would not have to be flat because it would not be reflecting light downward, as the bottom of the top surface would).

For example, illumination device 1110 would be generally rectangular in shape 1110A, take the form or a tree 1110B or other item, a heart 1110C, snowman 1110D, or other.

Figure 12:
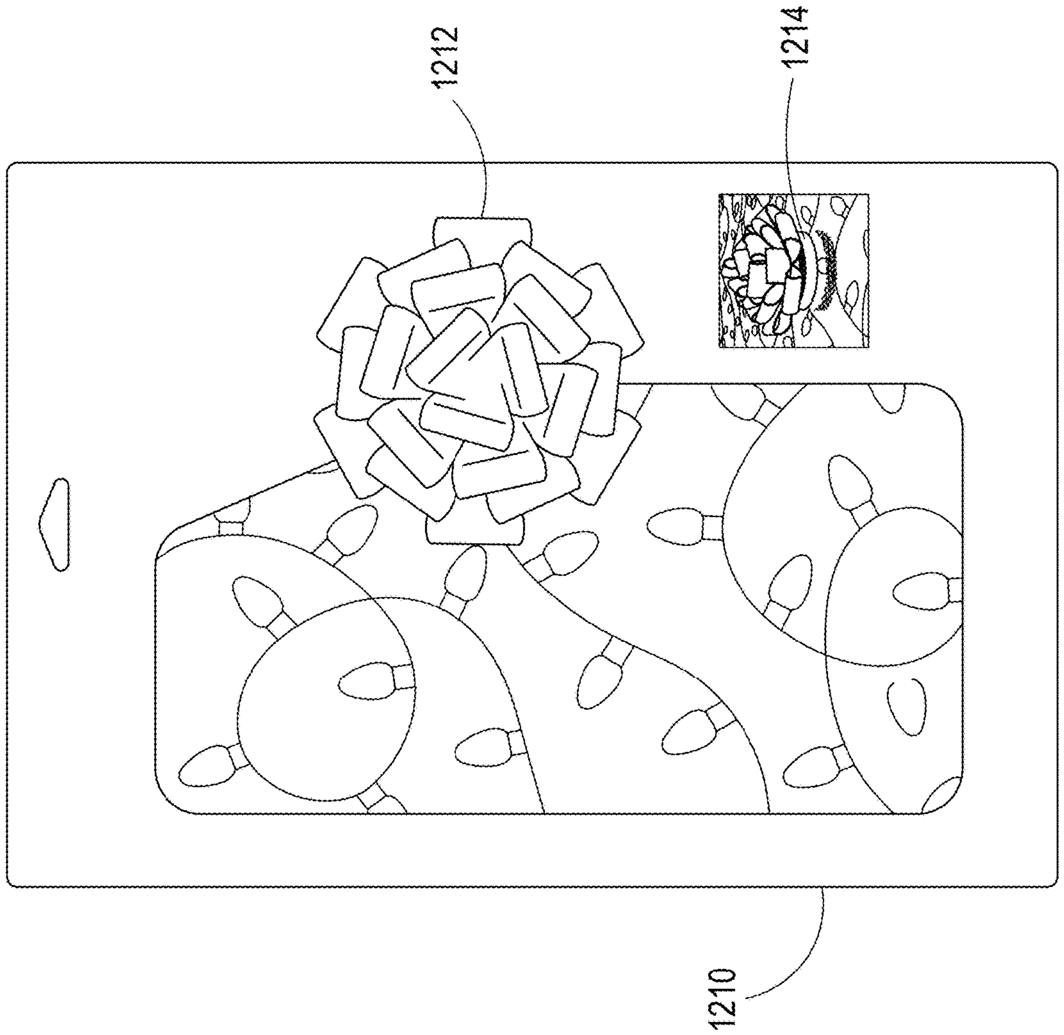
FIG. 12 depicts an illustrative light-reactive gifting system in accordance with an embodiment of the disclosed technology.

FIG. 12 depicts an illustrative light-reactive gifting system 1210 in accordance with an embodiment of the disclosed technology. In this embodiment, the ornamental attachment takes the form of a bow 1212. It can include a light-emitting device 1214.

Figure 13B:
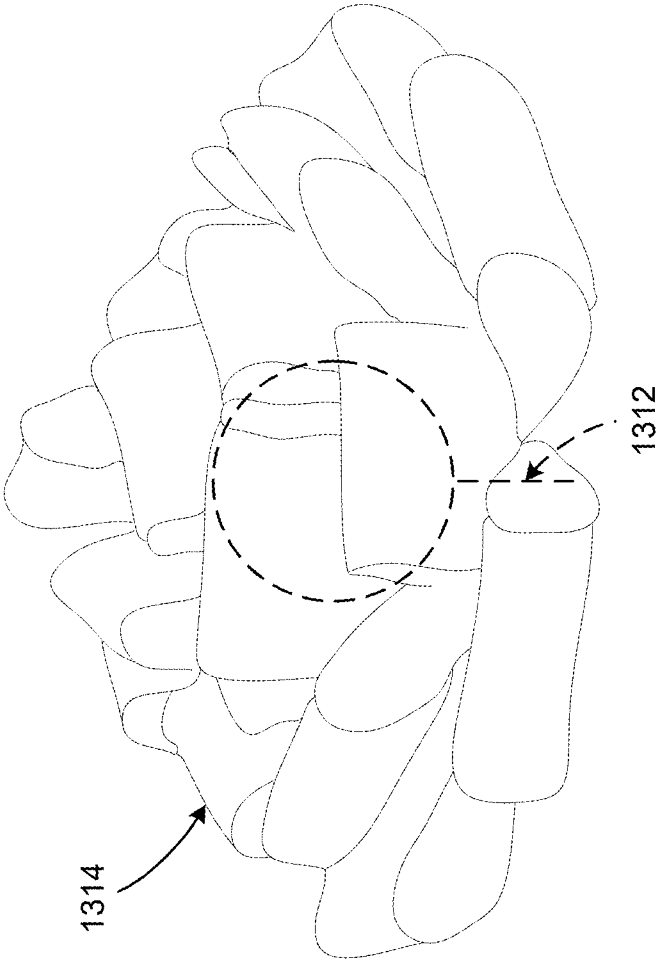
FIG. 13B depicts an illustrative light source disposed within an interior of an illustrative ornamental attachment in accordance with an embodiment of the disclosed technology.
Figure 13A:
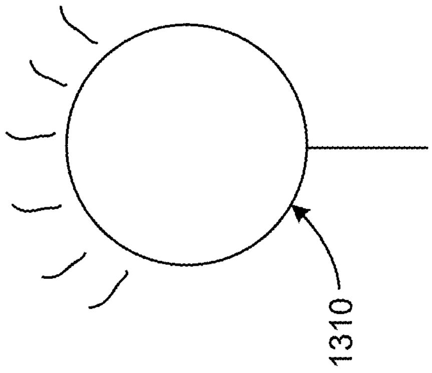
FIG. 13A depicts an illustrative light source in accordance with an embodiment of the disclosed technology.

FIG. 13A depicts an illustrative light-emitting device 1310. FIG. 13B illustrates an embodiment where such a light-emitting device 1312 is disposed within an interior of ornamental attachment 1314. In that arrangement, the light from light-emitting device 1312 is allowed to interact with the surfaces of ornamental attachment 1314 to enhance reflectivity, reactivity, or overall visual perception.

Figure 14:
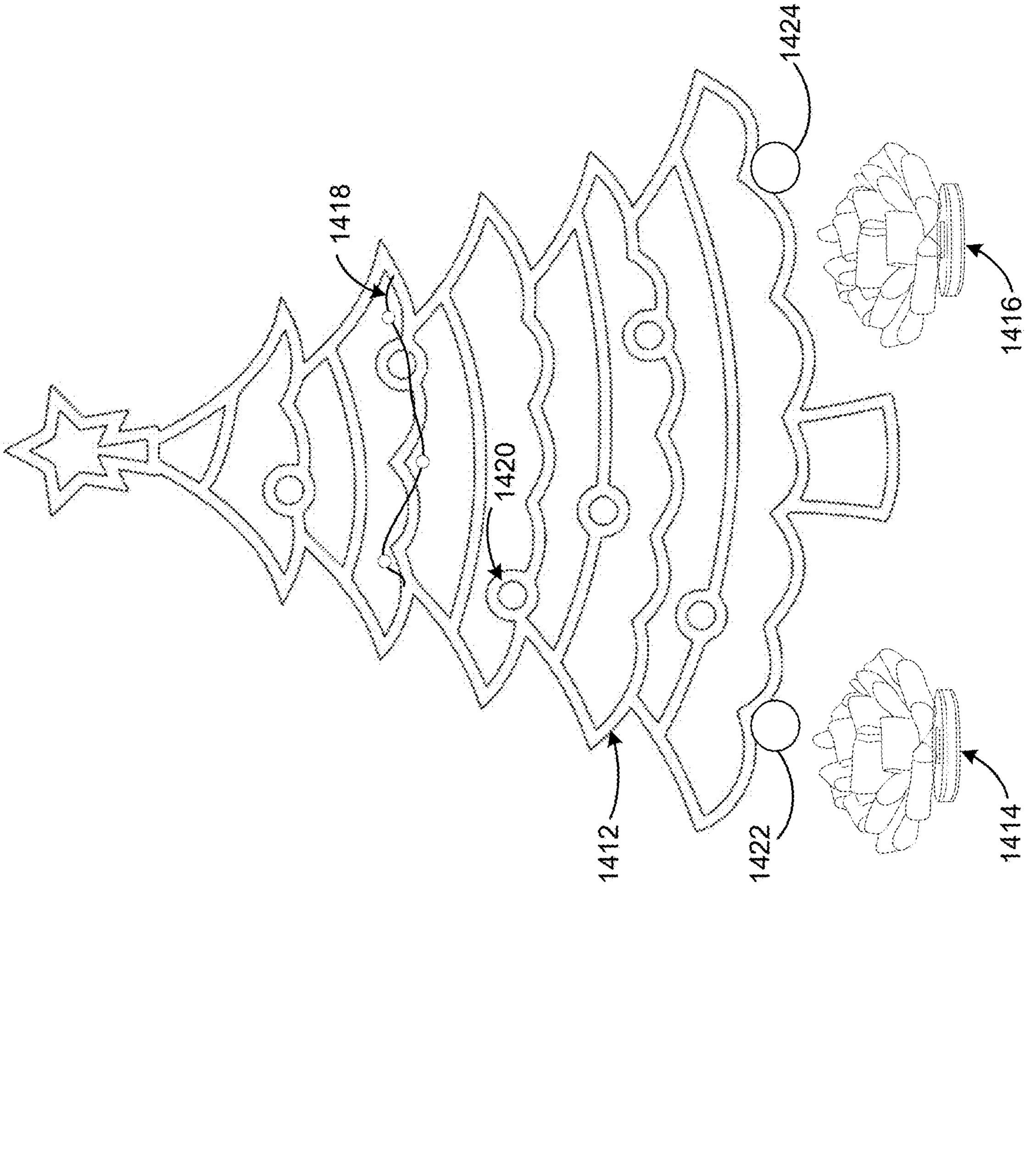
FIG. 14 depicts another illustrative operating environment in accordance with an embodiment of the disclosed technology.

FIG. 14 depicts an illustrative operating environment whereby one or more ornamental attachments interact with each other or other components. For example, a first ornamental attachment 1414 may interact with a second ornamental attachment 1416. For example, when one turns on, so does the other. Or they can interact with a string of lights 1418 or an ornament 1420 that is hung on a tree 1412. In this way, the ornamental attachments can interact with other components to facilitate a storytelling or themed-combination effect. For example, if ornamental attachment 1414 takes the form of a Santa Clause sleigh, then after it illuminates, the string of lights 1418 might blink in response. Or a related ornament 1420 will make a sound in response.

In other embodiments, alternative light sources could be used to illuminate the ornamental attachment. For example, a first light source 1422 could cast light on ornamental attachment 1414, obviating the need for its own light source (such as the puck portion shown). A light source 1424 could likewise illuminate ornamental attachment 1416 from above. The light source 1424 could be part of the tree or disguised as a typical ornament. In one embodiment, light sources 1422 or 1424 bias emitted light downward or in the direction of ornamental attachments 1414 or 1416. zzzz FIG. 15A shows an embodiment whereby downlighting is provided to ornamental attachment 1514 by an independent source 1518, which could take the form of a tent for example (or other form). It can include one or more lights 1520, such as LEDs, UV lights, and the like. Multiple light sources could be coupled to each other. For example, source 1518 could be coupled to source 1522, either via power or wireless communications.

Figure 15B:
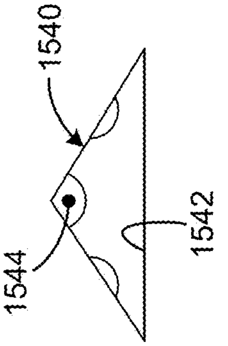
FIGS. 15A-15C depict still another illustrative operating environments in accordance with an embodiment of the disclosed technology.
Figure 15C:
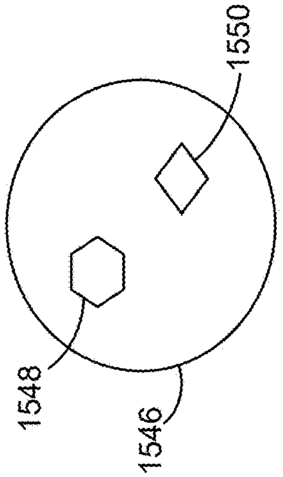
Figure 15A:
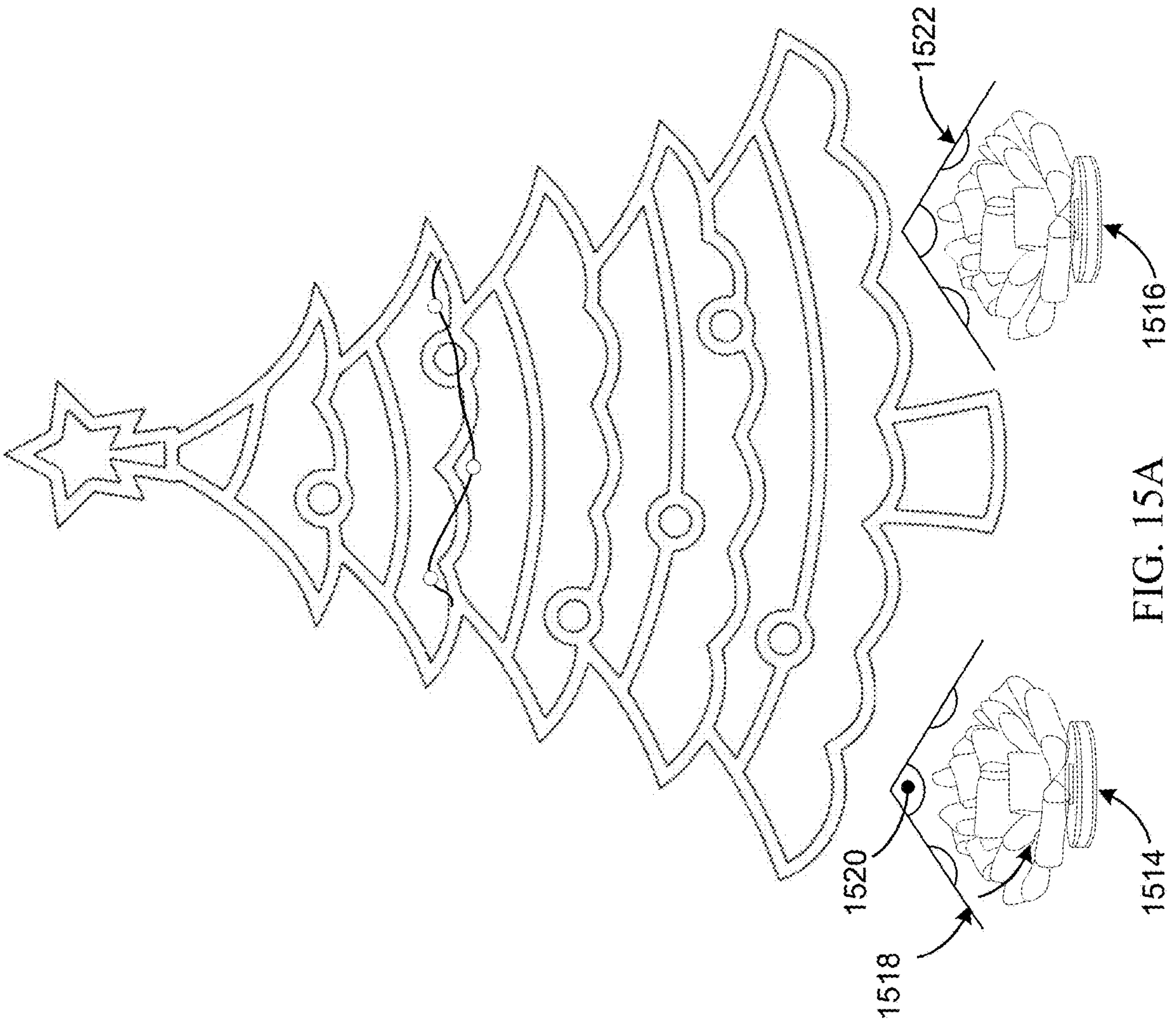

FIG. 15B shows an embodiment where a structure 1540 is closed. Structure 1540 is similar to 1518 or 1522 except that it is closed off by a bottom surface 1542. In one embodiment, all interior surfaces of structure 1540 are opaque, and bottom surface 1542 as one or more cutouts in desired shapes. Those cutouts would allow a shadow to be cast from light source 1544 to an underlying object, such as a present under a tree. FIG. 15C shows an example of the underside view of surface 1542 when it is circular in shape.

Two illustrative cutouts 1548 and 1550 are shown. This would allow casting a silhouette onto the gift wrap through a pattern cutout. Also, doing this through a forced perspective next to the LED 1544 through opaque material allows casting of shadows on the gift wrap (or other) canvases. LED placements could be alternated to show a two-stage animation on the surface of the gift wrap.

An enclosed LED (for example) within opaque material with cutouts to cast a shadow is described above. Sequencing two or more LEDs, in one embodiment, allows for 2-step cast movement. For example, an angled projected star shape shifting on the gift wrap (canvas). In one embodiment, the opaque material could be oriented so that it was less than 90 degree to wrap, such as 30 degrees downward for example.

In other embodiments, flexible-filament LEDs could be employed as a light source. They could be placed near the base of an illumination device.

Figure 16:
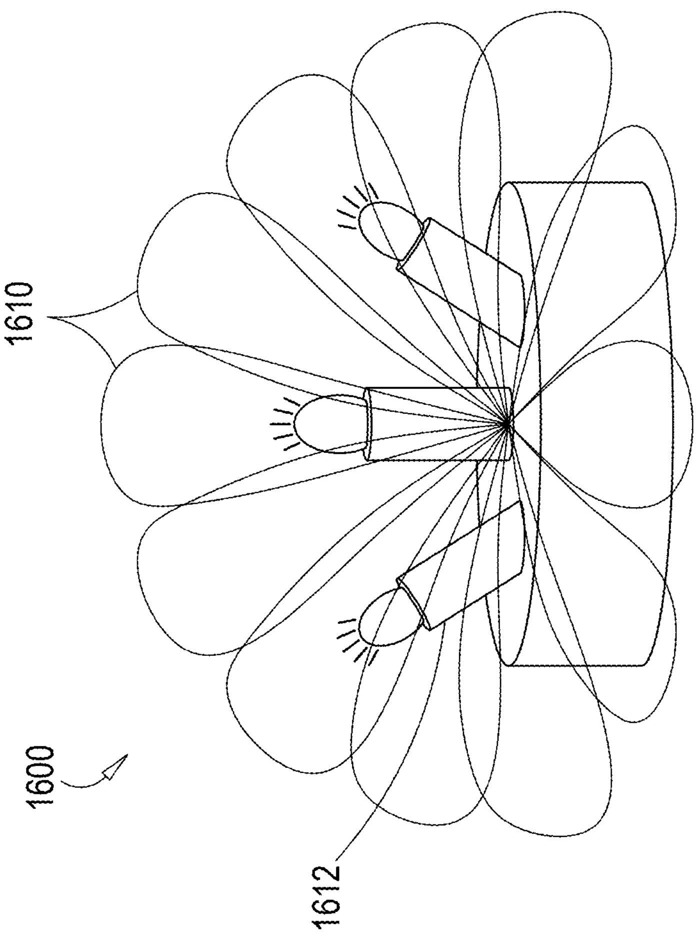
FIG. 16 depicts an embodiment of the disclosed technology illustrating flexible positioning and a central ribbon retaining post.

FIG. 16 depicts an embodiment 1600 that utilizes interior light sources, such as LEDs disposed within an interior of a bow structure. An illustrative LED 1612 is shown. In one embodiment, it includes a faceted lens that provides for the emission of varied light patterns. The bow structure can include several arms 1610 made of a ribbon or ribbon-like material.

Figure 17B:
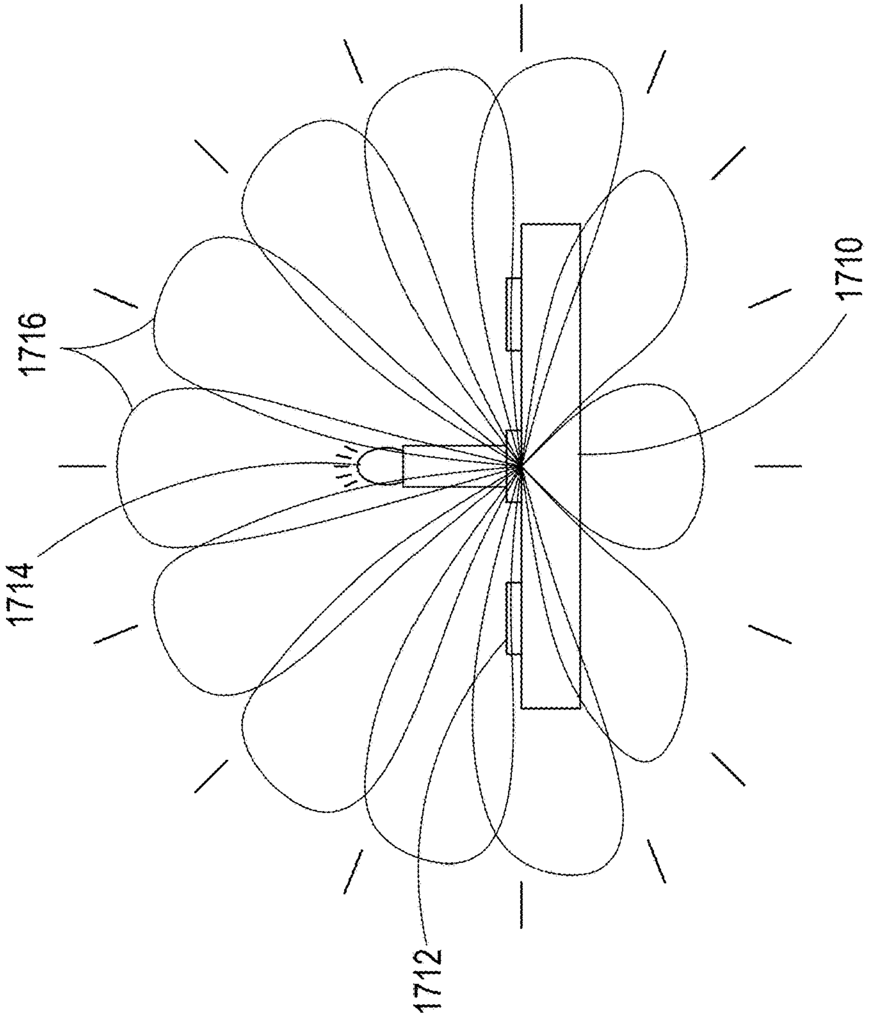
FIGS. 17A and 17B depicts chip-on-board ("CoB") embodiments of the disclosed technology.
Figure 17A:
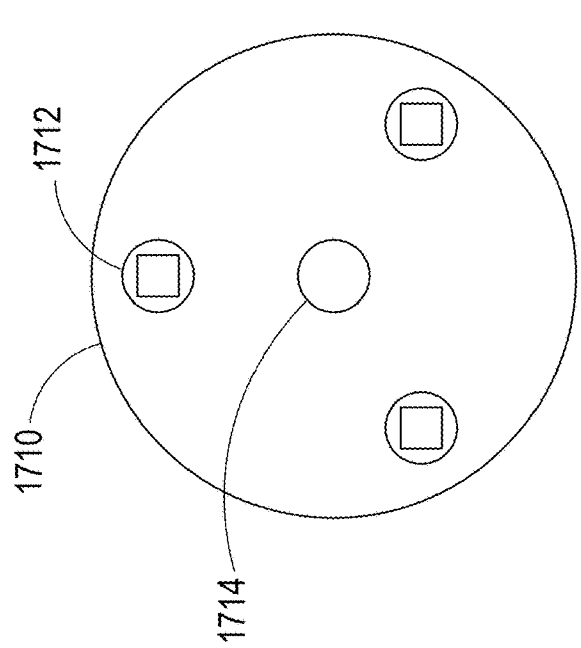

FIGS. 17A and 17B show an embodiment that uses flat LEDs disposed within a bow structure. As mentioned, the bow structure does not have to be in the form of a bow. It can be a papercraft or made of other material that takes on a variety of forms. FIG. 17 shows a device 1710 that includes a three flat LEDs, including LED 1712. If desire, a taller LED 1712 can also be used. The same device 1710 is shown in FIG. 17B, which shows many arms of a bow (such as arms 1716) along with a taller LED 1714.

Figure 18:
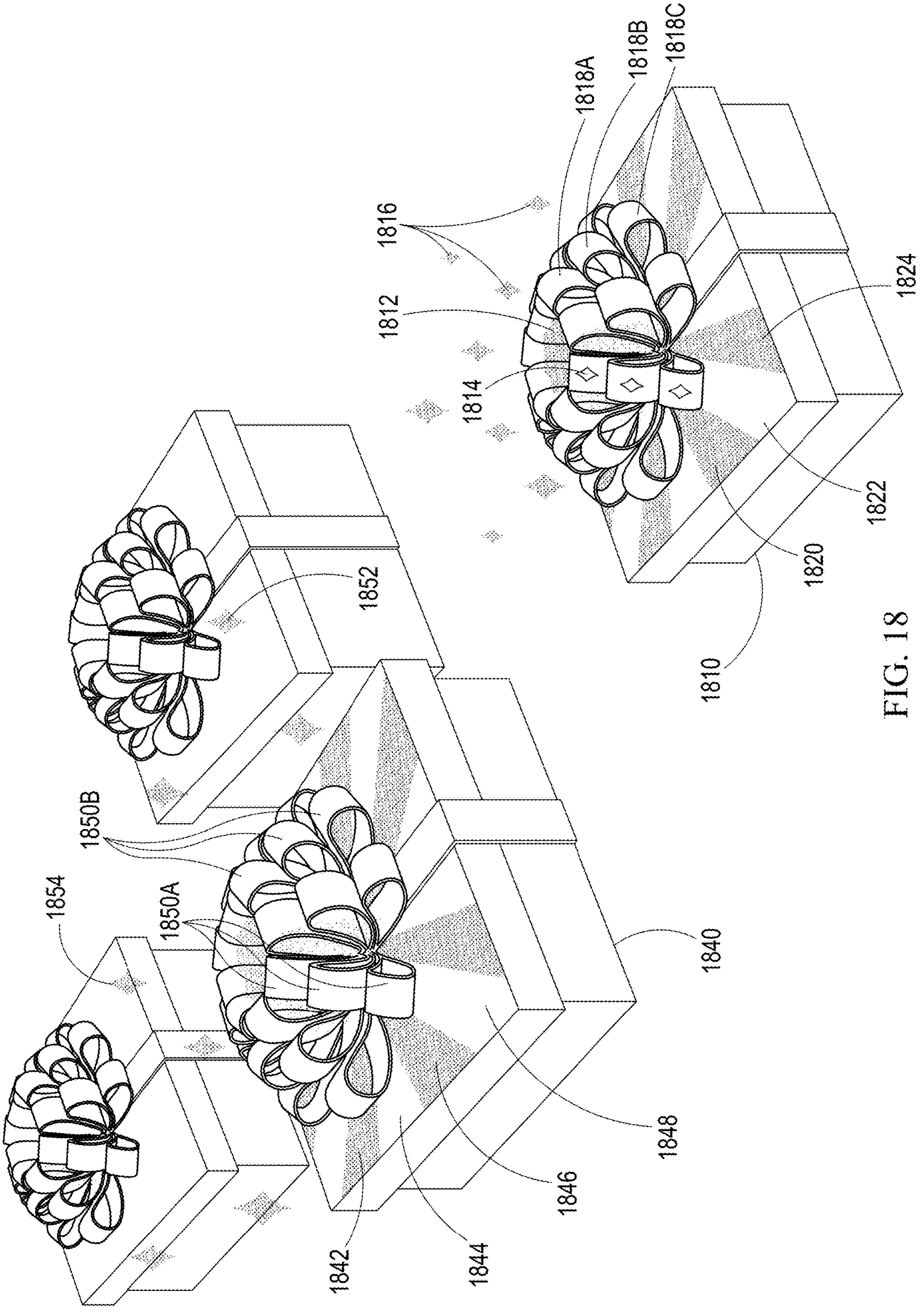
FIG. 18 depicts embodiments of the disclosed technology that intentionally align the ribbons of a bow to cast specific light and shadow patterns.

FIG. 18 depicts still another embodiment. This embodiment presents a re-purposeable or reuseable bow that presents a light show. Its ability to be reused makes it environmentally friendly. Under a tree, for example, one or more lenses can create patterns on a wall, on other gifts, or in the area under the tree. It includes an ability to present a lightshow and to coordinate with other devices. Sound can be included with a light show.

The device can operate in different modes. For example, in a first mode, the device assumes sleep state. In another mode, it pulsates light. In other mode, it chimes and presents a lightshow, on its own or in coordination with other devices. The more devices that are added, the more patterns and options that are available.

FIG. 18 shows a first bow on a first gift 1810. In illumination device 1812 is disposed within an interior of a bow structure. In this embodiment, the strips of one or more arms of the bow are arranged and aligned such that the interior light source 1812 casts specific patterns of light, shadows, or more. For example, ribbon portions 1818A, 1818B, 1818C are aligned with each other such that light source 1812, when illuminated, casts a light path (shown as shaded areas) as casts shadows (shown as non-shaded areas). Two illustrative lighted areas (lit via light-source 1812) area indicated by reference numerals 1820 and 1824. An illustrative shadow is shown by numeral 1822.

The strips of the bow can be made of diffraction material. The diffraction material, when interacting with light from light source 1812, casts patterns on nearby objects. Patterns can also be generated by perforations 1814 in the bow material. Illustrative patterns are shown by numeral 1816. This combination of how light source 1812 interacts with its surroundings, including casting deliberate portions of lighted, less-lighted, or non-lighted paths, is an aspect of the disclosed technology.

Another example is provided with reference to gift box 1840. It too includes a bow with an interior light source. Arm portions 1850A and 1850B of the bow are arranged and intentionally aligned with each other such that specific light-emitted patterns emerge. Light paths 1842 and 1846 are visually contrasted with lesser-let or non-lit paths 1844 and 1848. Pattern portions 1854 and 1852 are achievable via cutouts in the ribbon, diffractive ribbon, or similar.

Thus, FIG. 18 provides two examples of a gift bow that includes a plurality of ribbon arms wherein each ribbon arm includes a plurality of folded-over portions and wherein the plurality of ribbon arms are adapted to surround a light source and wherein each of the plurality of fold-over portions of each ribbon arm are aligned with each other such that when the light source is activated, a plurality of discrete lighted paths and non-lighted paths are emitted. Illustrative examples of ribbon arms are made up of folded-over portions 1818A, 1818B, and 1818C (or collectively 1850A and 1850B on the other bow). The folded-over portions are aligned with each other as part of each arm. When the light source (such as source 1812) is activated, discrete lighted paths (e.g., 1820 and 1824 or 1842 and 1846) as well as non-lighted paths (or less-lighted paths) (e.g., 1822 or 1844 and 1848) are created.

ILLUSTRATIVE USE CASES

In view of the disclosure above (and following), some illustrative use cases are described herein. Mini UV-LED's can be positioned at single or multiple points of upward/outward illumination such that light intersects with loops of a bow that have been treated with UV-reactive ink, film, coating, decorations, treatments, embossed elements, markings, patterns, and the like. UV-reactive material may also be incorporated into the bow/ornament material (plastic, paper, etc.) to create a uniform reactive lighting effect without printing.

With transparent ribbon loops, the glow effect may be amplified if desired. Other optical brighteners may be used in or on the bow to create a reactive lighting effect with UV LEDs or regular LEDs.

Light sources may be disposed a base of the ornamental attachment. A light-reactive substrate enhances light reflection and reactivity.

The ornamental attachment can function on its own or cooperating among a set to created desired visual or auditory effects. Thus, programmable multi-use ornamental attachments could be responsive to sound, motion, or similar.

A UV LED source with a diffuser could be used in an embodiment of the disclosed technology. The light source may be under or inside a dome-shaped, tent-shaped, or other shaped fixture that helps disperse or dissipate light biased in intentional directions.

The light source with diffuser could be within the puck (in such an embodiment), embedded within a bow, separately mounted underneath a tree, on a pedestal or along bottom branches, incorporated into a tree skirt, or integrated into another dimensional product such as a three-dimensional papercraft display.

UV-LED reactive embellishments (e.g., stickers, bows, ribbons, etc.) can be added to a gift presentation to further enhance aesthetics. The light puck could be adorned with optional anthropomorphic add-ons, such as eyelashes, eyelids, curved edges, etc. that helps taper the light to be aimed at a display of packages.

A front-facing papercraft decoration (such as the front of a cake) could face one direction, while a back surface (back of the paper structure, undecorated, but partially shrouded) could face a display of gifts to illuminate them. In this arrangement, the papercraft light station could be displayed facing one direction because if it says something on it or is decorated a certain way, and the back side could be facing away from a visible direction, thereby aimed at a collection of gift packages that have illuminated features.

A UV-LED station could be configured to only illuminate within a particular distance from the surface of the treated substrate via NFC, such as an illumination-ready bow or illumination-ready bag. If they get close enough to the light source, the LEDs could turn on to illuminate an area of object, such as a gift. But the lights would not glow or illuminate all the time in one embodiment. Rather, it would need to be positioned near the illumination substrate as part of a glow system in one embodiment.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility, may be employed without reference to other features and sub combinations, and are contemplated within the scope of the claims.

What is claimed is:

1. A gifting kit comprising:

(1) an illumination device comprising:

(A) a body adapted to be affixed to a planar surface;

(B) a plurality of ultraviolet electromagnetic radiation light-emitting diodes (UV LEDs) disposed within the body;

(C) an electrical circuit coupled to the UV LEDs that is adapted to control at least one presentation attribute of the UV LEDs;

(2) a bow affixable to the illumination device; and (3) at least one sheet of wrapping paper comprising a plurality of light-reactive print components that react with the UV LEDs such that one or more visual aspects of the print components varies in response to an intensity level of the UV LEDs.

2. The gifting kit of claim 1, wherein the body includes a translucent facial surface.

3. The gifting kit of claim 2, where the translucent facial surface is characterized by one or more of the following:

is shaped to act as a type of lens that is useable to direct light from the UV LEDs in a specific direction;

includes facet; or includes a pattern.

4. The gifting kit of claim 1, wherein the body includes an upper portion, a middle portion, and a lower portion.

5. The gifting kit of claim 1, wherein the plurality of UV LEDs is greater than or equal to two.

6. The gifting kit of claim 1, wherein one or more of the plurality of UV LEDs are oriented at toward a bottom surface of the body.

7. The gifting kit of claim 1, wherein the intensity level of the UV LEDs includes one or more of off and on.

8. The gifting kit of claim 1, wherein the intensity level of the UV LEDs varies between off and a brightest value.

9. The gifting kit of claim 1, wherein the electrical circuit provides one or more of the following functions:

an activation or deactivation control;

a timing control of the UV LEDs;

a display patter of the UV LEDs;

a display sequence of the UV LEDs;

an audio-input control that is adapted to receive audio commands;

an audio control that is adapted to control a volume level of audio output;

a wireless transmission control that is adapted to receive wireless commands; or a wireless transmission control that is adapted to send wireless commands.

10. The gifting kit of claim 1, wherein the illumination device includes a switch adapted to activate or deactivate the illumination device.

11. The gifting kit of claim 1, wherein the bow includes a reflective surface.

12. The gifting kit of claim 11, wherein at least one of the reflective surface helps reflect light from the UV LEDs toward a surface of wrapping paper when the bow is attached to the wrapping paper.

13. The gifting kit of claim 1, wherein the wrapping paper has a weight of less than or equal to one or more the following: 150 grams per square meter (GSM), 120 GSM, 100 GSM, 80 GSM, or 50 GSM.

14. The gifting kit of claim 1, wherein the light-reactive print components on the wrapping paper are created with UV-reflective ink.

15. The gifting kit of claim 14, wherein the light-reactive print components on the wrapping paper are substantially not visible in the absence of UV light but are substantially visible when illuminated with UV light.

16. The gifting kit of claim 14, wherein the illumination device further comprises a non-UV light source.

17. A light-reactive gifting system, comprising:

(1) an illumination device adapted to emit UV light that includes (A) a bottom, (B) a plurality of ultraviolet electromagnetic radiation light-emitting diodes (UV LEDs) situated to disperse UV light around least a portion of a perimeter of the illumination device, (C) a top, and (D) an electrical circuit adapted to control one or more operational functions of the illumination device;

(2) an ornamental attachment that is attachable to or that forms at least a portion of the top of the illumination device; and (3) an attachment mechanism that is useable to attach the illumination device to a target surface, thereby enabling the UV light to be cast toward the target surface and causing a first visual appearance of the target surface and a second visual appearance of the target surface based on activating or deactivating the UV LEDs.

18. The system of claim 17, wherein the illumination device further comprises a facial surface spanning a perimeter between the bottom and the top and, wherein the UV LEDs may be oriented toward the bottom such that, when activated, they cast UV light toward the target surface when the illumination device is attached to it.

19. The system of claim 18, further comprising paper that includes a first light-reactive component that reacts to the UV light and is characterized by having a first visual appearance when not reflecting the UV light and a second visual appearance when reflecting the UV light.

20. A gift bow, comprising a plurality of ribbon arms, wherein each ribbon arm includes a plurality of folded-over portions, wherein the plurality of ribbon arms are adapted to surround a light source, wherein each of the plurality of folded-over portions of each ribbon arm is aligned with each other such that when the light source is activated, a plurality of lighted paths are cast that are distinct from non-lighted paths.

* * * * *